United States Patent
Garnweidner

(10) Patent No.: US 9,873,397 B2
(45) Date of Patent: Jan. 23, 2018

(54) VEHICLE BODY COMPONENT

(71) Applicant: MAGNA INTERNATIONAL INC., Aurora, Ontario (CA)

(72) Inventor: Peter Garnweidner, Lamprechtshausen (AT)

(73) Assignee: Magna International Inc., Aurora, Ontario (CA)

( * ) Notice: Subject to any disclaimer, the term of this patent is extended or adjusted under 35 U.S.C. 154(b) by 67 days.

(21) Appl. No.: 14/899,907

(22) PCT Filed: Aug. 6, 2014

(86) PCT No.: PCT/CA2014/050737
§ 371 (c)(1),
(2) Date: Dec. 18, 2015

(87) PCT Pub. No.: WO2015/017932
PCT Pub. Date: Feb. 12, 2015

(65) Prior Publication Data
US 2016/0137150 A1    May 19, 2016

(30) Foreign Application Priority Data
Aug. 7, 2013 (DE) .......... 10 2013 215 534

(51) Int. Cl.
*B60R 19/00* (2006.01)
*B60R 19/18* (2006.01)
(Continued)

(52) U.S. Cl.
CPC .............. *B60R 19/18* (2013.01); *B23K 1/008* (2013.01); *B60R 19/03* (2013.01); *B60R 19/34* (2013.01);
(Continued)

(58) Field of Classification Search
CPC ......... B60R 19/18; B60R 19/03; B60R 19/34; B63K 1/008
(Continued)

(56) References Cited

U.S. PATENT DOCUMENTS

2007/0040398 A1* 2/2007 Lutke-Bexten ......... B60R 19/18
293/102
2009/0152881 A1* 6/2009 Shin ....................... B60R 19/18
293/102
(Continued)

FOREIGN PATENT DOCUMENTS

CA    2428122 A1    5/2002
CA    2547801 A1    7/2005
(Continued)

*Primary Examiner* — Joseph D Pape
(74) *Attorney, Agent, or Firm* — Dickinson Wright PLLC

(57) ABSTRACT

A vehicle body component for a motor vehicle is described, wherein the component is metallurgically connected to at least one other component, wherein the components have a flat contact area with each other, wherein one of the components is constructed as a solder-plated sheet part, and the metallurgical connection is brought about by a furnace soldering procedure. In particular, the vehicle body component is constructed as a bumper consisting of a bumper strut (SFT) extending substantially over the vehicle width and of at least one carrier (T) that carries the bumper strut (SFT) opposite the vehicle body, wherein at least one of the components is a solder-plated sheet part.

20 Claims, 4 Drawing Sheets

(51) Int. Cl.
  *B60R 19/03* (2006.01)
  *B60R 19/34* (2006.01)
  *B23K 1/008* (2006.01)

(52) U.S. Cl.
  CPC . *B60R 2019/182* (2013.01); *B60R 2019/1806* (2013.01); *B60R 2019/1826* (2013.01)

(58) Field of Classification Search
  USPC .......................................................... 293/102
  See application file for complete search history.

(56) References Cited

U.S. PATENT DOCUMENTS

| | | | | |
|---|---|---|---|---|
| 2010/0012308 | A1* | 1/2010 | Scheidegger | F28F 1/126 165/182 |
| 2010/0102578 | A1* | 4/2010 | Nilsson | B60R 19/18 293/102 |
| 2011/0005736 | A1* | 1/2011 | Tosun | F28D 1/05383 165/151 |

FOREIGN PATENT DOCUMENTS

| | | | |
|---|---|---|---|
| FR | 2910359 | A3 | 6/2008 |
| JP | 5935877 | A | 2/1984 |

* cited by examiner

VEHICLE BODY COMPONENT

CROSS-REFERENCE TO RELATED APPLICATIONS

This U.S. National Stage Patent Application claims the benefit of PCT International Patent Application Ser. No. PCT/CA2014/050737 filed Aug. 6, 2014 entitled "Vehicle Body Component," which claims the benefit of DE Patent Application Ser. No. 10 2013 215 534.4 filed Aug. 7, 2013, the entire disclosures of the applications being considered part of the disclosure of this application and hereby incorporated by reference.

FIELD OF THE INVENTION

The present invention relates to a body component for a motor vehicle, and a process for forming the vehicle body component.

BACKGROUND

Vehicle body parts consist of formed sheet steel and/or are manufactured from aluminum. Sheet parts are formed to profiles and connected by welding, soldering, flanging (rolling) to other components. It is known in the case of aluminum to manufacture profile parts as extruded parts. Profile parts are used in particular in the area of bumpers, in which the forces are received and forwarded in provided directions.

The connecting of profile parts by welding is expensive and the expenditure of time for the welding process—independent of the welding method—depends on the connection length, i.e., the length of the welding seam. Also, the heat charge that takes place during the welding process during the shaping of the component must be considered.

Even connections by welding, hard welding, cause the cited disadvantages. Basically, the partial heat charge is less here but the solder required for the process must be added.

The use of solder-plated sheets in the construction of motor vehicles is known. For instance, heat exchangers are manufactured using such materials. A hard solder—usually AlSi12—is applied by a rolling process on a sheet in the case of a solder-plated sheet. An appropriately thin layer results from the rolling. The thin hard solder layer forms the connection layer, the carrier material and the sheet yields the required strength. The joining takes place by a furnace soldering, during which the solder is made available via the solder-plated aluminum sheets. The components are held by fixing elements in the position in which the connection is to take place. The furnace soldering takes place at approximately 590° C.

SUMMARY OF EMBODIMENTS OF THE INVENTION

The basic problem is to make a vehicle body component available in a form that is improved in comparison to the known solutions.

According to the invention a vehicle body component is provided that comprises at least one solder-plated sheet part that is connected by a furnace soldering procedure to another component, in particular to another sheet part.

The component in accordance with the invention preferably comprises a solder-plated aluminum sheet that is furnace-soldered to another aluminum sheet or to a steel sheet. It is advantageous here that given an appropriately flat shaping of the contact areas of the components a transfer of force, a connection strength and characteristic such as in the case of an adhesion can be achieved.

The number of the joining positions is not relevant for the cycle time. The components to be connected are brought in contact to each other and with each other and fixed and then subjected to a heat treatment in a soldering furnace.

Combination parts of aluminum and steel can be readily manufactured. If necessary, depending on the material used and the forces provided, an adhesion-imparting layer is generated, for example, by galvanizing, on the steel part, the steel sheet.

Combination parts of aluminum-steel make possible a weight-optimized manner of construction so that the components can be very well adapted to the forces to be received. Thus, the steel part can offer the high strength and the aluminum component is the completion on account of the lower density with correspondingly low weight.

In the case of a pure aluminum structural group different aluminum alloys can be used as carrier sheets. When using 3xxx (AlMn), 5xxx (AlMg) and 6xxx (AlMgSi) as carrier material a soft state can be approximately achieved by a furnace soldering. Precisely in the case of a crash box a 5182 (AlMg4,5Mn) in a soft state can be advantageous. Therefore, material states with very good deformability can be manufactured.

Another property can be achieved if low-alloyed 7xxx alloys such as, e.g., 7020 (AlZn4,5Mg1) are used as carrier material 7020. This material is so insensitive to the quenching after the solution annealing (hard soldering) that it still has a super-saturated mixed crystal even after having cooled off in calm air and can therefore be subsequently aged warm. Therefore, a required component characteristic can be achieved by a purposeful heat treatment after the furnace soldering. This can take place by an air current quenching of the component soldered in the furnace with a subsequently 2-phase ageing at, e.g., 100° C. and 140° C.

A preferred embodiment of the invention provides a bumper system. The latter consists of a total of three structural groups, namely, the bumper stmt extending transversely to the direction of travel, two carriers as well as receiving plates receiving the strut on the left and the right side of the vehicle frame, by means of which the carriers can be mounted and fastened to the vehicle frame.

The bumper strut constructed as a transverse strut is formed from a cap-shaped profile part and from a plate terminating this cap profile. The two parts are furnace-soldered—the plate is solder-plated aluminum sheeting and the cap profile is heat-transformed steel or aluminum 7020 (AlZn4,5Mg1). The cap profile and the plate terminating the cap profile are in flat contact with one another at the two edge ends of the profile and connected to one another metallurgically by the solder of the solder-plated aluminum sheet.

The two carriers that carry the bumper strut and are supported against the vehicle frame, the body of the motor vehicle, consist of two furnace-soldered, solder-plated aluminum sheets. The two parts profiled in a Z shape make a flat contact on their outer areas and are connected to one another in a flat manner in this contact area by the furnace soldering procedure.

The two carriers comprise the cap rail area of the bumper strut, the two outer flanks of the cap rail running parallel to one another. Since the two Z profiles of the carrier consist of solder-plated aluminum sheeting, the connection between carrier and cap rail or the bumper stmt can also be achieved by a furnace soldering. The connection of the receiving plates to the carriers is achieved by a welding connection. The receiving plates are manufactured, e.g., as an aluminum extruded profile.

BRIEF DESCRIPTION OF THE DRAWINGS

The explanation of an exemplary embodiment of the invention takes place in the following using the drawings.

DETAILED DESCRIPTION OF THE DRAWINGS

Figure 1:
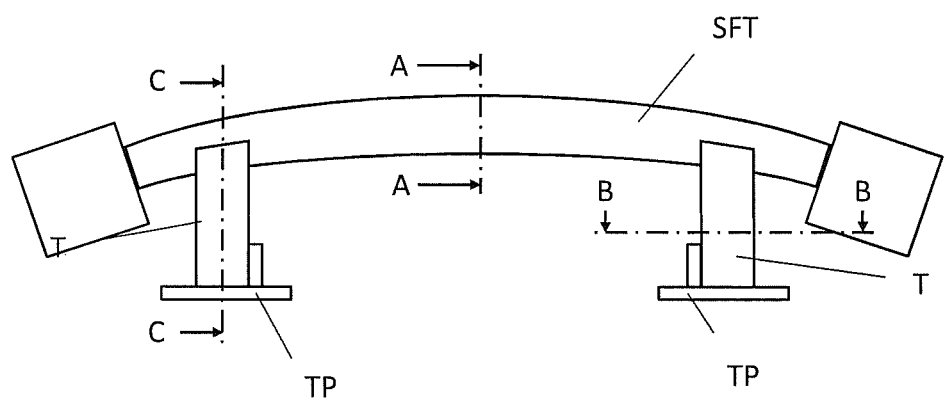
FIG. 1 shows a bumper for a motor vehicle (not shown) in a top view.

FIG. 1 shows a bumper for a motor vehicle (not shown) in a top view. A bumper stmt SFT constructed in a curved manner in the direction of travel is carried by two carriers T extending in the direction of travel. The bumper strut SFT is therefore a transverse strut extending substantially over the width of the vehicle.

The carriers T have a holding and carrier plate TP on the end facing away from the bumper strut SFT by means of which the carriers T and therefore the entire bumper arrangement can be mounted on the body (not shown) of the vehicle. The carrier plates TP have openings to this end so that the bumper device can be mounted by screws on the motor vehicle, the body.

Figure 2:
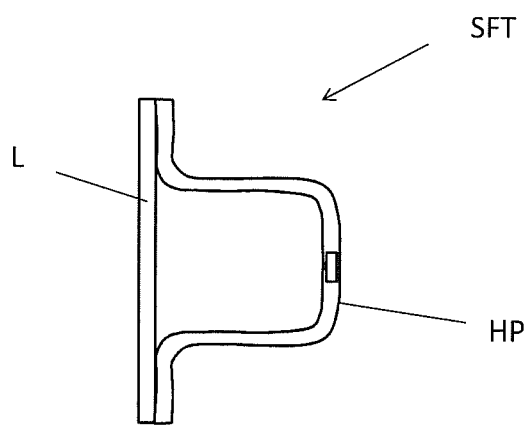
FIG. 2 shows the bumper stmt SFT in profile, as a section taken along line A-A in FIG. 1.

FIG. 2 shows the bumper stmt SFT in profile as a section taken along the line A-A in FIG. 1. The bumper strut SFT consists of a cap profile HP and a strip L closing the open profile. The cap profile HP and the strip closing the profile are designed to be curved in the direction of travel, wherein the components have this curvature already before the joining together. The cap profile HP is manufactured from heat-deformed steel. Alternatively, the cap profile HP can also be manufactured from aluminum, e.g., 7020 (AlZn4, 5Mg1). The strip L closing the profile in the direction of travel is manufactured from a solder-plated aluminum sheet, wherein the solder-plate inside, surface of the strip L, faces the cap profile side.

The strip L as well as the cap profile HP have a flat contact in the area of the bent ends of the cap profile HP. The metallurgical connection of the components is then produced in this contact area by a furnace soldering. During the construction of the cap profile HP as a steel profile it preferably has an adhesion-imparting layer, a galvanization.

Figure 3:
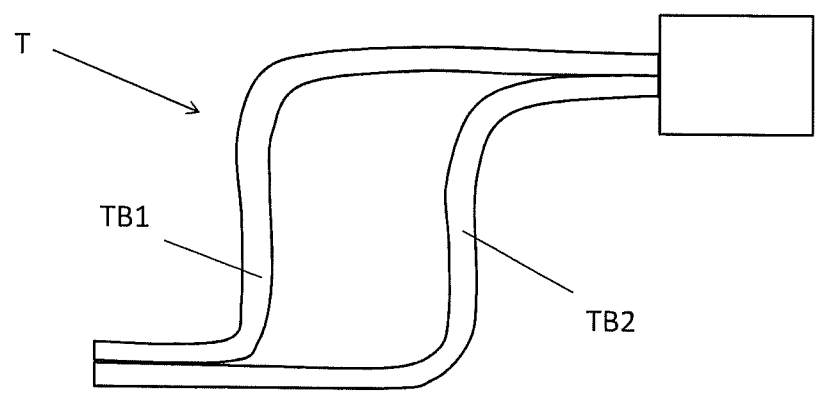
FIG. 3 shows a section through one of the carriers T, taken along line B-B in FIG. 1.

FIG. 3 shows a section through one of the carriers T, taken along the line B-B in FIG. 1. The carrier T is therefore composed of carrier sheets TB1, TB2 with a Z-shaped form. The two carrier sheets TB1, TB2 have a flat contact in the outside profile areas. The carrier sheets TB1, TB2 consists of solder-plated aluminum sheeting and the solder-plated sides of the sheets TB1, TB2 lie opposite and facing one another. The connection of the two carrier plates TB1, TB2 takes place by a furnace procedure.

Figure 4:
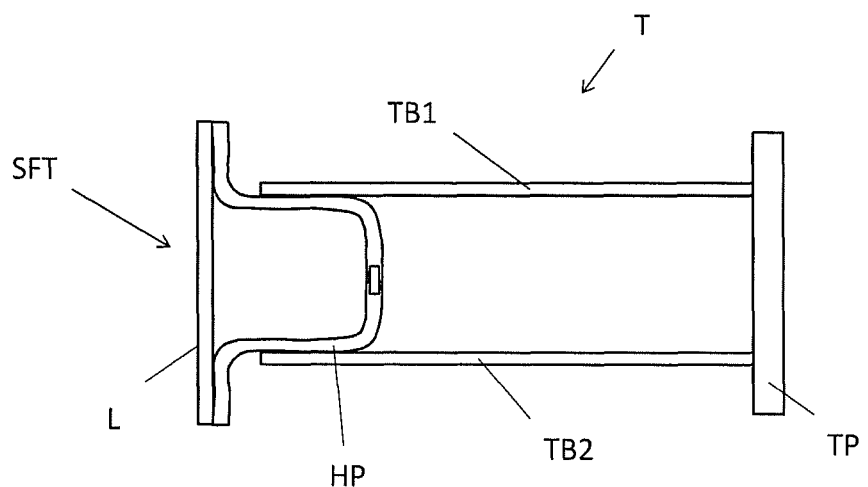
FIG. 4 shows a section in the longitudinal direction of the carrier T, taken along the line C-C in FIG. 1.

FIG. 4 shows a section in the longitudinal direction of the carrier T, taken along the line C-C in FIG. 1. The cap profile HP of the bumper strut SFT makes flat contact with the middle profile areas of the carrier sheets TB1, TB2 forming the carrier T. Since the solder-plated sides of the carrier sheets TB1, TB2 are opposite and facing one another the carrier sheets TB1, TB2 make contact with the cap profile HP, the two outer surfaces of the cap profile HP running parallel to one another, via the solder-plated surface.

The carrier plate TP is constructed as an extruded aluminum profile and set on the end of the carrier T opposite the bumper stmt SFT. The connection of the carrier plate TP and of the carrier T formed by the two carrier sheets TB1, TB2 is produced by a welding procedure.

In order to manufacture the described bumper the parts are brought in contact with each other in the provided position, fixed, e.g., by clamping devices and then thermally treated in a furnace soldering procedure. In order to reduce the expense and/or the number of required clamping devices in the furnace process the parts can also be pre-fixed by a passage joining process.

LIST OF REFERENCE NUMERALS

SFT bumper strut, traverse
T carrier
TP carrier plate, base plate
HP cap profile, cap profile rail
L strip
TB1 carrier sheet
TB2 carrier sheet

What is claimed is:

1. A component for a motor vehicle, wherein the component is metallurgically connected to at least one other component, wherein a contact area between the components is flat, wherein one of the components is constructed as a solder-plated sheet part, the metallurgical connection is brought about by a furnace soldering procedure, wherein a carrier carries at least one of the components, and the carrier is manufactured from two sheets profiled in a Z shape.

2. The component according to claim 1, wherein the solder-plated sheet part is constructed as an aluminum sheet part.

3. The component according to claim 1, wherein one of the components is the solder-plated sheet part, and the at least one other component includes a further sheet part.

4. The component according to claim 3, wherein the further sheet part is also a solder-plated sheet part.

5. The component according to claim 3, wherein the further sheet part is an aluminum sheet part.

6. The component according to claim 3, wherein the further sheet part is a steel sheet part.

7. The component according to claim 5, wherein the further sheet part comprises a coating that is adhesion-imparting for the solder.

8. The component according to claim 7, wherein the further sheet part is a steel sheet part with a galvanization as the adhesion-imparting coating.

9. The component according to claim 1, wherein the component for the motor vehicle is constructed as a bumper strut extending substantially over the vehicle width, and the carrier carries the bumper strut.

10. The component according to claim 9, wherein the bumper strut includes a cap profile rail.

11. The component according to claim 10, wherein the cap profile rail is manufactured from steel.

12. The component according to claim 10, wherein the at least one other component includes a sheet constructed as a strip, and the cap profile rail has an open side and is connected on the open side to the sheet constructed as a strip.

13. A component for a motor vehicle, wherein the component is constructed as a bumper strut extending substantially over the vehicle width, the bumper strut is metallurgically connected to another component, wherein a contact area between the bumper strut and the other component is flat, wherein at least one of the bumper strut and the other component is constructed as a solder-plated sheet part, the metallurgical connection is brought about by a furnace soldering procedure, wherein a carrier carries the bumper strut, and wherein the carrier is manufactured from two sheets profiled in a Z shape.

14. The component according to claim 10, wherein the carrier has a flat contact with outer surfaces of the cap profile rail, and the outer surfaces of the cap profile rail run parallel to one another.

15. A component for a motor vehicle, comprising a first component part that is connected to at least one other component part by a metallurgical connection, wherein the a contact area between the component parts is flat, wherein one of the component parts is constructed as a solder-plated sheet part, the metallurgical connection is formed within the flat contact area by a furnace soldering procedure.

16. A process for forming a component for a motor vehicle, comprising:
   arranging a first component part adjacent to at least one other component part wherein a contact area between the component parts is flat, at least one of the component parts is constructed as a solder-plated sheet part;
   using a furnace soldering procedure, metallurgically connecting the first component part and the at least one other component part within the flat contact area.

17. The process according to claim 16, including constructing one of the component parts as a bumper strut extending substantially over the vehicle width, wherein the bumper strut includes a cap profile rail, and at least one carrier carries the bumper strut.

18. A process for forming a component for a motor vehicle, comprising:
   arranging a first component part adjacent to another component part, wherein the first component part is constructed as a bumper strut extending substantially over the vehicle width, the bumper strut includes a cap profile rail, wherein a contact area between the bumper strut and the other component part is flat, at least one of the bumper strut and the other component part is constructed as a solder-plated sheet part;
   using a furnace soldering procedure, metallurgically connecting the bumper strut and the other component part within the flat contact area;
   at least one carrier carries the bumper strut and including manufacturing the carrier from two carrier sheets profiled in a Z shape and soldering the two sheets to present an opening therebetween, and wherein the carrier sheets each have a flat contact with outer surfaces of the cap profile rail, wherein the outer surfaces of the cap profile rail run parallel to one another.

19. The process according to claim 18, including soldering a strip to the cap profile rail of the bumper strut.

20. A bumper for a motor vehicle, comprising:
   a bumper strut including a cap profile presenting a U-shape and having bent ends extending outwardly from the U-shape, the cap profile being curved between the bent ends, and the cap profile being formed of heat-deformed steel or aluminum;
   the bumper strut further including a strip closing the cap profile to present an opening between the cap profile and the strip, the strip being curved between the bent ends, the strip being formed of aluminum, and the strip having a solder-plated surface contacting the bent ends of the cap profile;
   the bent ends and the solder-plated surface of the strip being flat in an area in contact with one another;
   a pair of carriers each extending traversely from the bumper strut adjacent the opposite ends for mounting to a motor vehicle, the carriers being formed of aluminum;
   each of the carriers including a pair of carrier sheets presenting a Z-shape and defining an opening therebetween, the cap profile of the bumper strut being received in the openings of the carriers and contacting an inner surface of the carrier sheets;
   each of the carrier sheets having flat contact areas located outwardly of the opening and soldered to one another along the flat contact areas; and
   each of the carriers including a carrier plate welded to ends of the carrier sheets opposite the bumper strut and closing the opening between the carrier plates.

* * * * *